T. HIMMELBERGER.
Horse Rake.
No. 74,358.   Patented Feb. 11, 1868.
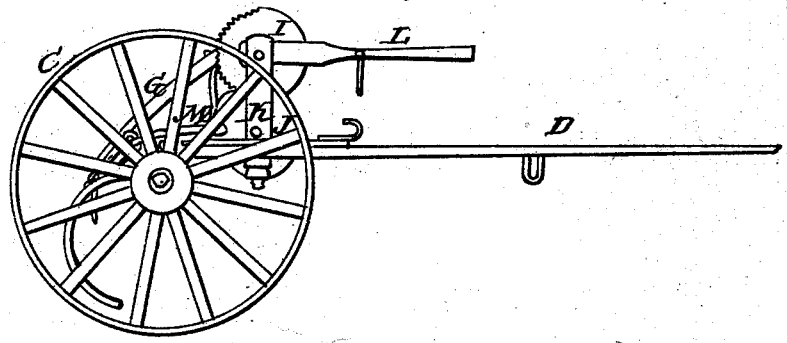
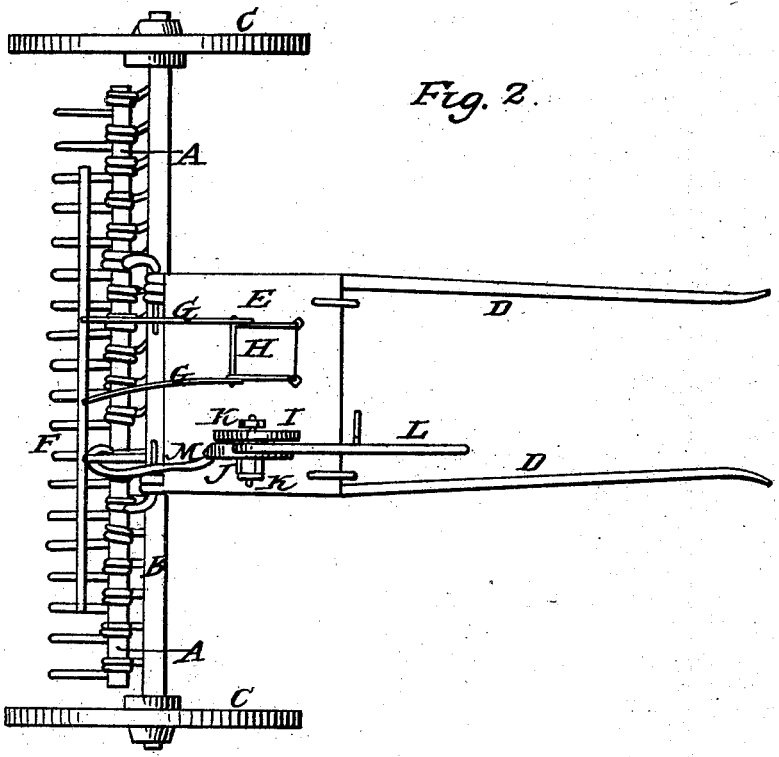

United States Patent Office.

TYSON HIMMELBERGER, OF HEIDELBERG TOWNSHIP, PENNSYLVANIA.

Letters Patent No. 74,358, dated February 11, 1868.

---

IMPROVEMENT IN HORSE-RAKES.

---

*The Schedule referred to in these Letters Patent and making part of the same.*

---

TO ALL WHOM IT MAY CONCERN:

Be it known that I, TYSON HIMMELBERGER, of Heidelberg township, in the county of Berks, and in the State of Pennsylvania, have invented certain new and useful Improvements in Hay-Rakes; and do hereby declare that the following is a full, clear, and exact description thereof, reference being had to the accompanying drawings, and to the letters of reference marked thereon.

In the annexed drawings, making part of this specification, A represents a rake-head, which may be constructed in any of the known and usual ways, is provided with teeth, as usual, and is made fast to an axle, B. C C represent the wheels, which support the axle B. D D represent the shafts of the machine, which are hinged to the axle, and which are provided with a platform, E, which supports the driver's seat, and also those devices which operate the rake. F represents a bar, which lies across and upon the rake-teeth, and which serves to clear them when the rake is revolved to release its load. This bar F is connected to the frame of the seat by means of two connecting-rods G G. Erected upon the platform E are two standards, K K, and lying from one to the other of these standards are two shafts. I represents a wheel, which is provided with cog-gearing upon a portion of its periphery, and also with a handle, L, which projects out from it, as seen in the figures. This wheel I is secured upon the upper shaft of the uprights K. A wheel, J, is secured upon the lower shaft. Secured to one face of wheel J is a pinion, into the teeth of which the teeth upon wheel I are made to mesh. M represents a connecting-rod, which connects the rake-head to the wheel J, near its periphery. H represents the driver's seat.

To operate this rake, the driver, who sits in the seat H, takes hold of handle L, and by moving it causes the wheel I to partially rotate backwards and forwards. The wheel I, operating upon the pinion upon wheel J, causes said wheel to partially rotate, and thus act upon the rake-head through connecting-rod M. The driver can readily, from his seat and by means of the handle L, raise the rake-teeth, by causing the rake-head to partially revolve, and thus discharge the load of hay which they have gathered, or he can lower them again by the same means to enable them to gather hay.

Having thus fully described my invention, what I claim as new, and desire to secure by Letters Patent, is—

The arrangement of the rake-head A with the axle B, connecting-rod M, wheel J and its pinion, and the wheel I with its handle, the whole operating as and for the purpose herein set forth.

In testimony that I claim the foregoing invention, I have hereunto set my hand, this 14th day of September, 1867.

<div style="text-align:right">TYSON HIMMELBERGER.</div>

Witnesses:
   DANIEL PACY,
   JOHN McKNIGHT.